Oct. 14, 1952  G. R. ATTRIDE  2,613,488
APPARATUS FOR PACKAGING FROZEN FRUIT JUICES
Filed Aug. 18, 1950
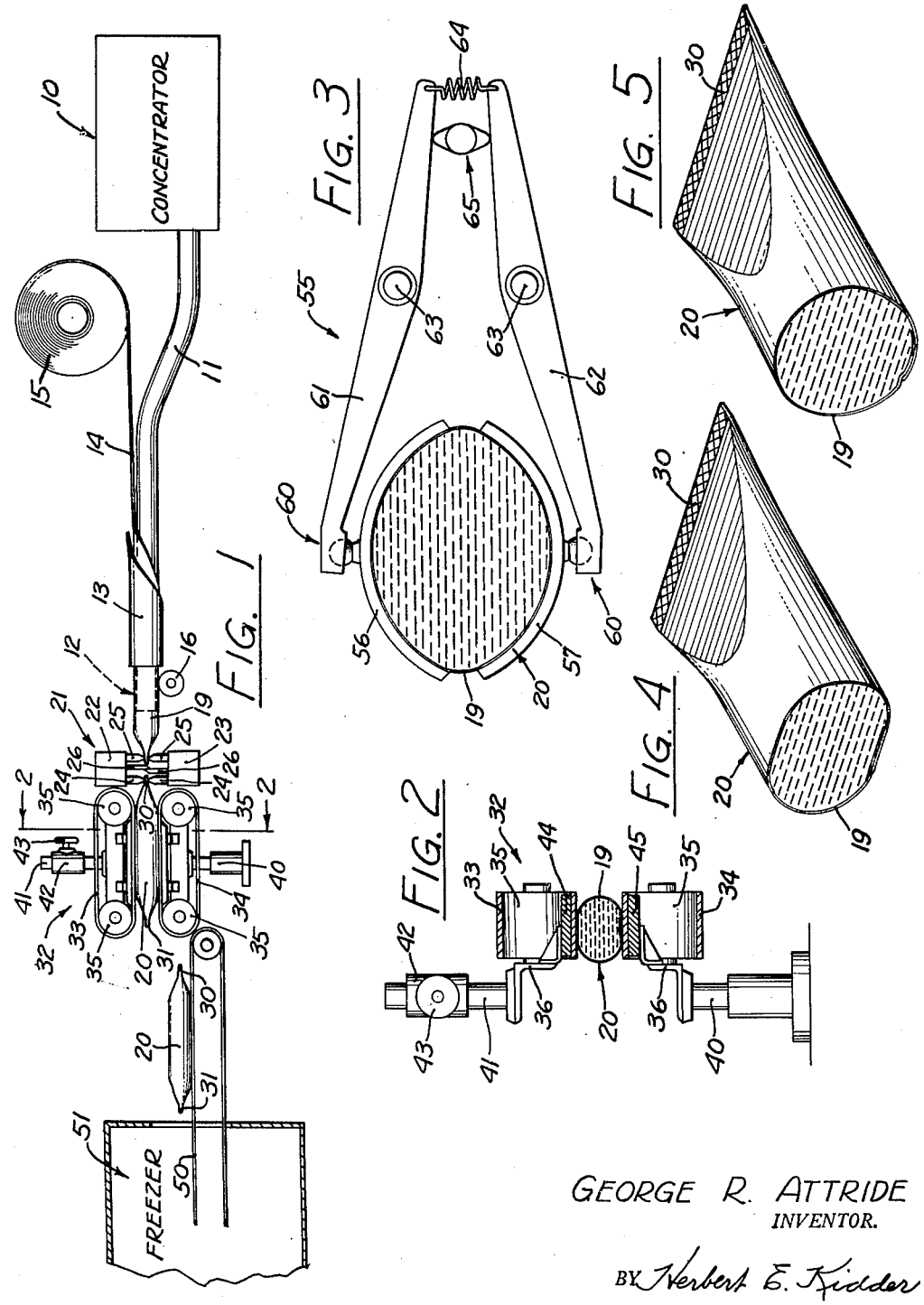
GEORGE R. ATTRIDE
INVENTOR.
BY Herbert E. Kidder
AGENT Patented Oct. 14, 1952

2,613,488

UNITED STATES PATENT OFFICE 2,613,488

APPARATUS FOR PACKAGING FROZEN FRUIT JUICES

George R. Attride, Riverside, Calif.

Application August 18, 1950, Serial No. 180,177

3 Claims. (Cl. 53—58)

The present invention relates to the packaging of frozen foods, and its primary object is to provide a new and improved method and means for packaging frozen liquids or semi-liquids, such as concentrated citrus juices.

The conventional practice of packaging frozen concentrated citrus juices in 6 oz. metal cans has a number of shortcomings; one of which is the unavoidable exposure of the juice to air in the canning process, resulting in a marked deterioration of the flavor and quality of the juice. In the present invention, exposure of the juice to air after it leaves the concentrator is entirely eliminated, and the result is an improved product that is much superior to any juice packaged by conventional canning methods.

One widespread objection to the present 6 oz. cans relates to the size of the container. When diluted with three volumes of water, the 6 oz. can makes 1½ pints of natural juice. Where there are only one or two members in a family, this is usually too large an amount, whereas if there are five or six in the family, the amount may be too small. When the quantity prepared is in excess of the family requirements, the surplus is usually put into the refrigerator until the next day. A few hours exposure to air results in a disagreeable change in taste of the left over juice. Another objection to the present metal can is the bother of opening the can and then disposing of the empty can.

The present invention overcomes both of the above objections by providing a new and improved cellophane package containing just the right amount of concentrate to make an individual 4 oz. glass of natural strength juice. In its preferred form, the package of the present invention is substantially cylindrical in shape, sealed at both ends, and contains 1 fluid oz. of concentrated juice. To prepare a glass of natural strength juice, the user merely snips off the sealed end with scissors or knife, places the package in a juice glass, and fills the glass with water. In a few moments the wisp of cellophane is removed, and the result is a perfect glass of natural strength citrus juice already cooled to the desired temperature.

In addition to its convenience of use, the package of the present invention has other advantages. For one thing, the cost of materials, machinery, and labor for packaging juice in cellophane tubes under the method of the present invention is considerably less than for canning the juices, which makes possible a lower price in the market—always a desirable feature in any highly competitive field. Another desirable aspect of the invention is that the eye-appeal of the product can be greatly enhanced by the use of colored cellophane. For example, a bright orange cellophane would be used with orange juice; bright yellow for blended juice; and light green for grapefruit juice. Such colors not only make a more attractive product, but also serve the useful purpose of identifying the particular product in every step in processing and storage.

The most important aspect of my invention has to do with the particular method and means employed in the packaging process, whereby the cellophane tube is filled with just the exact amount of juice to provide a plump, attractive package, yet without endangering the cellophane to rupture from the expansion of the liquid juice as the latter is frozen. To this end, I provide means for continually forming a tube from strip cellophane, with means for extruding the concentrated juice into the tube. Beyond the extruder is a heat-sealing and cut-off mechanism which seals the tubing at regularly spaced intervals, and cuts the same into sausage-like lengths. Just before the posterior end of the individual package is sealed, the package is compressed or distorted slightly, so as to reduce the amount of concentrate within the package to a quantity slightly less than the maximum volumetric capacity of the unrestrained package. The amount of volumetric reduction of the package is preferably regulated to approximately equal the expansion of the liquid during the subsequent freezing step, so that when the juice is frozen, the cellophane tube will be filled out to form a plump, smooth package.

Among other outstanding advantages of the invention is the great savings effected in the cost of shipping concentrated fruit juice packaged in the manner of my invention, as compared with the cost of shipping juice in metal cans. The 6 oz. can in almost universal use at the present time weighs slightly more than 40.58 grams, whereas the material required for an equal quantity of juice packaged according to the present invention weighs only 8.85 grams. This saving of over 31.73 grams per 6 oz. unit of juice, when multiplied by 100,000 (the number of cartons of six 1 oz. units that can be held in the average refrigerated freight car) amounts to 6,996 lbs. per carload. The savings in freight alone will average from $75.00 to $150.00 per car, depending upon the size of the car and the distance shipped.

Another source of considerable savings is in the storage and handling of empty containers at the plant of the packer. Empty can storage space required for one carload of 6 oz. cans will suffice for the material to package twenty carloads of juice packaged in the manner of the present invention. The labor cost of unloading, storing, and using the packaging materials is greatly reduced, and deterioration of the packaging material from dust, smudge, and contamination is practically eliminated.

Still another advantage of the invention lies in the simple, uncomplicated machinery that is required; and in the fact that the method is a straight line process, which is automatic and adapted to high speed production. A further production advantage resides in the complete flexibility of package size which is obtainable with only minor adjustments of the machine.

The foregoing and other objects and advantages of the present invention will become apparent to those skilled in the art upon consideration of the following detailed description of a presently preferred embodiment thereof, reference being had to the accompanying drawings, wherein:

Figure 1 is a schematic drawing of a juice packaging machine employing the method of the present invention;

Figure 2 is an enlarged, transverse vertical section, taken at 2—2 in Figure 1;

Figure 3 is a view of an alternative arrangement for compressing or distorting the filled tube just prior to sealing the posterior end of the package;

Figure 4 is a sectional, perspective view of the unfrozen package, showing the distortion in a somewhat exaggerated degree; and Figure 5 is a similar view of the package after the liquid contents have been frozen, allowing the manner in which the expansion of the contents causes the cellophane package to be filled out firm and plump.

In the drawings, the reference numeral 10 designates a concentrator of the high-vacuum, low-temperature type, in which the water of freshly expressed fruit juice is evaporated to concentrate the juice to one-fourth of its original volume. From the concentrator 10, the juice is pumped through a pipe 11 to a nozzle 12, which extends through a tube-forming sleeve 13. The sleeve 13 has a flared throat at the right-hand end thereof, that functions to curl the edges of a flat strip 14 of cellophane or other film down around and under the nozzle 12; the strip 14 being paid off a reel 15. The edges of the strip 14 overlap at the bottom of the nozzle 12, and these overlapping edges are welded together by a heated roller 16 as the material emerges from the sleeve 13, thereby forming the cellophane strip into tubing 19.

The concentrated juice is extruded from the nozzle 12 into the tubing 19, and the filled tubing is sealed transversely and severed into sections 20 of predetermined length by a sealing-and-cutting unit 21. The unit 21 comprises top and bottom heads 22 and 23, respectively, each of which includes two spaced heating elements 24 and 25, with a shearing blade 26 interposed between them. The heads 22, 23 are vertically movable toward and away from one another, and when they are brought together, the cooperating heating elements 24, 25 flatten the tubing 19 between them and weld the opposite sides thereof together at 30 to form the posterior end of the package 20. In like manner, the cooperating heating elements 24, 25 flatten the tubing 19 between them and weld the opposite sides thereof together at 31 to form the anterior end of the package 20. At the same time that the welds 30, 31 are formed, the tubing is sheared through between the welds by the blades 26, thereby severing the completed and filled package 20 from the remainder of the tubing.

Prior to the sealing of its posterior end, the package 20 is compressed or distorted slightly in a distorting apparatus 32, which may take any of several forms; the presently preferred form being shown in Figures 1 and 2. In this embodiment the package 20 is squeezed slightly between two endless belts 33 and 34 which are arranged one above the other. Both belts are passed around pairs of pulleys 35, which are rotatably supported on structural members 36. The bottom member 36 is fixedly supported on a standard 40, while the top member is attached to a post 41 which is slidable vertically through a sleeve 42. A hand wheel 43 on the sleeve enables the post 41 to be clamped in any adjusted position.

The bottom run of the top belt 33 is backed up by a plate 44, and one of the pulleys 35 is motor-driven, so that the bottom run of the belt travels from right to left at the same rate of speed as that of the tubing as the latter leaves the end of the nozzle 12. In like manner, the top run of the bottom belt 34 is backed up by a plate 45, and one of the pulleys is motor-driven so that the top run of the belt travels from right to left at the same rate of speed as the top belt 33.

The purpose of distorting the package 20 slightly before the posterior end thereof is sealed, is to reduce the volumetric capacity of the tubing below the potential capacity of the undistorted, cylindrical tubing by an amount substantially equal to the expansion of the concentrate in the subsequent freezing step. The amount of distortion can be varied by raising or lowering the top belt 33, so that the package is squeezed to a lesser or greater extent. While its capacity is thus reduced, the package is cross sealed and severed. The package thus formed is somewhat limp and flaccid in appearance, although it is completely filled with concentrate to its reduced capacity and contains no air whatsoever.

The packages 20 discharge from the distorting apparatus 32 drop onto a belt conveyer 50 and are carried into a quick freezer 51, where they are frozen to the desired consistency. The expansion produced by freezing of the liquid concentrate causes the latter to fill the package to its maximum potential capacity, thereby distending the sidewalls of the tubing and producing a plump, cylindrical package with wedge-shaped ends, as shown in Figure 5.

I wish to make it clear at this point that the invention is not in any way limited to the use of a sealer which makes wedge-shaped ends on the package, as it is also contemplated that the ends of the package might be closed by a twisting operation, which would produce a pointed end. Neither is the invention to be construed as being limited to the use of cellophane, inasmuch as Pliofilm or other sheet material capable of being heat sealed will work just as effectively.

In certain instances, it may be desirabe to partially freeze the concentrate before extruding it into the package, in which case most or all of the expansion due to freezing will have already occurred, and the degree of distortion may be reduced to the minimum. It may even be found that some of the sheet materials of which the package is made possess sufficient elasticity to substantially accommodate the remaining small amount of expansion upon complete freezing. In such cases, the distorting apparatus would be adjusted to give an almost imperceptible amount of distortion, and would function more as a guiding and supporting means for the package while the latter is being filled and its posterior end sealed and severed. If there is any doubt, however, as to the sufficiency of the elasticity of the package material, it is advisable to regulate the unit to produce at least a perceptible amount of distortion so as to insure that the packages will not rupture.

Another arrangement for producing distortion of the packages is shown in Figure 3. This alternative distortion apparatus, designated in its entirety by the reference numeral 55, would merely be substituted for the apparatus 32 of Figures 1 and 2. In the apparatus 55, two jaws 56 and 57 are positioned above and below the tubing, and are periodically engageable with the same to squeeze the tubing 20 between them. Accordingly, the jaws 56, 57 are shaped to fit the tubing, and may be faced with rubber or other material to avoid damaging the tubing. The jaws 56, 57 are fastened by ball and socket joints 60 to arms 61, 62, which are pivoted at 63 for vertical swinging movement. The right-hand ends of the arms 61, 62 are pulled together by a spring 64, which acts to open the jaws 56, 57. The jaws are closed on the package 20 by means of a rotating cam 65, and are coordinated with the action of the sealing and severing unit 21 (Figure 1) so that the partially formed package, filled with concentrated juice but as yet unsealed, is grasped by the jaws 56, 57 and distorted until the instant that the unit 21 seals and severs the package. In Figure 3, the cam 65 is shown in the operating position, and the jaws are clamped down on the package. Immediately after the sealing and severing of the package, the cam 65 is rotated 90°, allowing the spring 64 to pull the jaws apart so that the package can be removed to the freezer. The degree of distortion may be adjusted by varying the shape of the jaws 56, 57, or by varying the size or shape of the cam 65. Proper adjustment may provide any degree of distortion from extreme to none at all.

While I have shown and described in considerable detail what I believe to be the presently preferred form of my invention, it will be understood that various changes may be made without departing from the broad scope of the invention, as defined in the appended claims.

I claim:

1. Apparatus for packaging frozen fruit juices, comprising means for forming an endless tube of thermoplastic sheet material, means for extruding juice into said tube while excluding air therefrom, means for cross-sealing said tube at substantially uniformly spaced intervals along the length thereof to form individual packages, means for compressing each of said packages at the time the posterior end thereof is sealed, so that the amount of juice contained therein is equal to the full volumetric capacity of the package less the amount required for expansion on freezing, and a freezer for quick-freezing said fruit juice to produce a solid, completely filled, cylindrical package.

2. Apparatus for packaging frozen fruit juices, comprising means for forming an endless tube of thermoplastic sheet material, a nozzle extending into and completely filling said tube, said nozzle being operable to introduce juice into said tube while excluding air therefrom, means for cross-sealing said tube at substantially uniformly spaced intervals along the length thereof to form individual packages, means engageable with said package at the time the posterior end thereof is sealed for distorting said package so that its volumetric capacity is less than the maximum potential capacity of the undistorted package, the amount of said volumetric reduction being substantially equal to the expansion of the liquid on freezing, and a freezer for quick-freezing said fruit juice to produce a solid, completely filled, cylindrical package.

3. Apparatus for packaging frozen fruit juices, comprising means for forming a flat strip of thermoplastic sheet material into an endless tube, a nozzle extending into and completely filling said tube for introducing juice into the tube while excluding air therefrom, means for heat-sealing said tube transversely at substantially uniformly spaced intervals along the length thereof as the tube progresses beyond said nozzle, said heat-sealing means simultaneously forming a weld at the posterior end of a filled package and another weld at the anterior end of the next succeeding package, means for severing said packages between each pair of welds, distorting means engageable with said package so that the volumetric capacity thereof is reduced below the maximum potential capacity of the undistorted package by an amount substantially equal to the expansion of the liquid contents on freezing, and a freezer for quick-freezing said fruit juice to produce a solid, completely filled, cylindrical package.

GEORGE R. ATTRIDE.

REFERENCES CITED

The following references are of record in the file of this patent:

UNITED STATES PATENTS

| Number | Name | Date |
|---|---|---|
| 1,775,549 | Birdseye | Sept. 9, 1950 |
| 2,113,658 | Lakso | Apr. 12, 1938 |
| 2,166,643 | Salfisberg | July 18, 1939 |